(12) United States Patent
Yoshida et al.

(10) Patent No.: US 7,283,349 B2
(45) Date of Patent: Oct. 16, 2007

(54) ELECTRIC DOUBLE LAYER CAPACITOR

(75) Inventors: Hiroshi Yoshida, Chiba (JP); Hidenori Nakata, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 11/525,973

(22) Filed: Sep. 25, 2006

(65) Prior Publication Data

US 2007/0070581 A1    Mar. 29, 2007

(30) Foreign Application Priority Data

Sep. 26, 2005    (JP)    ............................. 2005-277461

(51) Int. Cl.
*H01G 9/00*    (2006.01)

(52) U.S. Cl. ...................... 361/502; 361/504; 361/508; 361/512; 361/516; 361/519; 252/62.2

(58) Field of Classification Search ................. 361/502, 361/503, 504, 508, 510–512, 516–519, 523–528; 252/62.2

See application file for complete search history.

(56) References Cited

U.S. PATENT DOCUMENTS

| | | | |
|---|---|---|---|
| 5,742,474 A | 4/1998 | Shimizu et al. | |
| 5,917,309 A | 6/1999 | Shimizu | |
| 6,064,562 A | 5/2000 | Okamura | |
| 6,094,338 A * | 7/2000 | Hirahara et al. | 361/502 |
| 6,310,762 B1 * | 10/2001 | Okamura et al. | 361/502 |
| 6,402,792 B1 * | 6/2002 | Hiratsuka et al. | 29/25.03 |
| 6,631,074 B2 * | 10/2003 | Bendale et al. | 361/509 |
| 6,697,249 B2 * | 2/2004 | Maletin et al. | 361/502 |
| 6,914,768 B2 * | 7/2005 | Matsumoto et al. | 361/502 |
| 6,949,317 B2 * | 9/2005 | Yoshida et al. | 429/303 |

FOREIGN PATENT DOCUMENTS

| | | |
|---|---|---|
| EP | 1 239 495 A1 | 9/2002 |
| JP | 6-65206 | 8/1994 |
| JP | 8-107047 A | 4/1996 |
| JP | 9-92583 A | 4/1997 |
| JP | 10-270293 A | 10/1998 |
| JP | 11-67608 A | 3/1999 |
| JP | 2000-188244 A | 7/2000 |
| JP | 2003-289022 A | 10/2003 |

OTHER PUBLICATIONS

Search Report dated Jan. 25, 2007, issued in corresponding European Application No. 06254841.7.

* cited by examiner

*Primary Examiner*—Nguyen T. Ha
(74) *Attorney, Agent, or Firm*—Westerman, Hattori, Daniels & Adrian, LLP.

(57) ABSTRACT

An electric double layer capacitor has a pair of current collectors, a positive polarizable electrode which is provided on one of the pair of current collectors, includes activated carbon of a weight $W_+$ and has a capacitance $C_+$, a negative polarizable electrode which is provided on the other of the pair of current collectors, includes activated carbon of a weight $W_-$ and has a capacitance $C_-$, a separator interposed between the positive and negative polarizable electrodes, and an organic electrolytic solution which impregnates at least the positive and negative polarizable electrodes and the separator, wherein $C_-/C_+=0.6$ to $1.0$ and $W_-/W_+=1.1$ to $2.0$. Even when continuously charged at a high applied voltage, the electric double layer capacitor has a high retention of capacitance and a low rise in internal resistance, and thus has an excellent durability.

5 Claims, 2 Drawing Sheets

ELECTRIC DOUBLE LAYER CAPACITOR

CROSS-REFERENCE TO RELATED APPLICATION

This non-provisional application claims priority under 35 U.S.C. §119(a) on Patent Application No. 2005-277461 filed in Japan on Sep. 26, 2005, the entire contents of which are hereby incorporated by reference.

BACKGROUND OF THE INVENTION

1. Field of the Invention

The present invention relates to an electric double layer capacitor.

2. Prior Art

The energy that can be stored in an electric double layer capacitor is proportional to the square of the voltage applied to the capacitor. Theoretically, it should be possible to increase the stored energy of the capacitor by increasing the voltage applied to the capacitor.

However, in conventional electric double layer capacitors which use organic electrolytic solutions, when a relatively high voltage of about 2.5 V or more is applied, both the positive and negative electrodes reach their reaction potentials, giving rise to decomposition of the electrolytic solution, and thus leading to problems such as declines in the durability and cycle characteristics of the capacitor.

In light of this, efforts are being made to find ways of increasing the voltage rating of capacitors within a range where the respective reaction potentials (decomposition potentials) of the positive and negative electrodes are not reached by controlling the capacitance ratio between the positive and negative polarizable electrodes within an appropriate range.

For example, JP-B 6-65206 discloses an electric double layer capacitor in which, by adjusting the capacitances of the positive and negative polarizable electrodes to a ratio which is the reciprocal of the ratio between the reaction potentials of the positive and negative electrodes, with reference to 0 potential in a plot of the potential-current characteristics, the time it takes for the positive and negative electrode to reach their respective reaction potentials when a voltage is applied can be made the same.

JP-A 8-107047 discloses an electric double layer capacitor in which the specific surface area of the activated carbons used in the positive and negative polarizable electrodes and the weight ratio of the activated carbons are controlled within suitable ranges.

JP-A 9-92583 discloses an electric double layer capacitor in which, by controlling the coating weight ratio in the positive and negative polarizable electrodes, the capacitance ratio between the positive and negative polarizable electrodes is set in accordance with the respective potentials at which an irreversible current arises in the positive and negative electrodes.

JP-A 10-270293 discloses an electric double layer capacitor in which the capacitances of the respective positive and negative electrodes are made to differ by, for example, varying the surfaces areas of the positive and negative polarizable electrodes.

JP-A 2000-188244 discloses an electric double layer capacitor in which the capacitance ratio between the positive electrode and negative electrode used as the polarizable electrodes is 1.5 or higher.

JP-A 2003-289022 discloses an electric double layer capacitor in which the solid volume or weight distribution of the positive and negative polarizable electrodes has been optimized.

It is known that, in conventional electric double layer capacitors which use organic electrolytic solutions, when a high voltage is applied, the positive electrode side reaches the reaction potential first.

The solution employed in the above and other capacitors already known to the art is to make the coating weight of the activated carbon on the positive electrode side higher than that on the negative electrode side so as to increase the capacitance of the positive electrode and lower the potential of the positive polarizable electrode, thereby delaying arrival of the positive electrode side at the reaction potential.

However, control of the positive and negative electrode potentials is transient. It is not always possible, merely by setting the capacitance ratio or the coating weight ratio of the positive and negative polarizable electrodes to a value that represents an excess of the positive electrode, to obtain a capacitor having excellent durability and cycle characteristics.

JP-A 11-67608 discloses an electric double layer capacitor in which activated carbons of mutually differing pore size distributions are used in the positive and negative polarizable electrodes.

However, this disclosure makes no mention of any association with the electrolyte used, nor does it suggest or imply anything specific concerning the combination of positive and negative pore size distributions and the capacitor characteristics. Furthermore, the coating weights of the activated carbons used in the positive and negative electrodes are the same.

In any case, there have hitherto been no known electric double layer capacitors which, when continuously charged under the application of a high voltage of about 3V, clearly suppress a decrease in capacitance and a rise in internal resistance, and thus have an excellent durability.

SUMMARY OF THE INVENTION

It is therefore an object of the invention to provide an electric double layer capacitor which, even when continuously charged under a high applied voltage, has a high percent retention of capacitance and a low degree of rise in internal resistance, and thus has an excellent durability.

We have found that, by controlling the ratio between the capacitance of the positive polarizable electrode and the capacitance of the negative polarizable electrode within a specific range and by controlling the weight ratio between the positive electrode side activated carbon and the negative electrode side activated carbon within a specific range, there can be obtained an electric double layer capacitor which, even when continuously charged at a high applied voltage, has a high percent retention of capacitance and a low degree of rise in internal resistance, and thus has an excellent durability.

Accordingly, the invention provides an electric double layer capacitor having a pair of current collectors; a positive polarizable electrode which is provided on one of the pair of current collectors, constructed so as to include activated carbon of a weight $W_+$, and has a capacitance $C_+$; a negative polarizable electrode which is provided on the other of the pair of current collectors, is constructed so as to include activated carbon of a weight $W_-$, and has a capacitance $C_-$; a separator interposed between the positive and negative polarizable electrodes; and an organic electrolytic solution which impregnates at least the positive and negative polarizable electrodes and the separator. The capacitance $C_+$ of the positive polarizable electrode and the capacitance $C_-$ of the negative polarizable electrode satisfy the condition $C_-/C_+=0.6$ to $1.0$, and the weight $W_+$ of the activated carbon included in the positive polarizable electrode and the weight $W_-$ of the activated carbon included in the negative polarizable electrode satisfy the condition $W_-/W_+=1.1$ to $2.0$.

Preferably, the organic electrolytic solution includes at least an ionic liquid of formula (1)

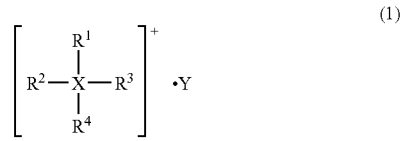

(1)

wherein $R^1$ to $R^4$ are each independently an alkyl group of 1 to 5 carbons or an alkoxyalkyl group of the formula $R'-O-(CH_2)_n-$ ($R'$ being methyl or ethyl, and the letter n being an integer from 1 to 4) and any two of $R^1$, $R^2$, $R^3$ and $R^4$ may form a ring together with X, with the proviso that at least one of $R^1$ to $R^4$ is the alkoxyalkyl group of the above formula; X is a nitrogen atom or a phosphorus atom; and Y is a monovalent anion.

The organic electrolytic solution may include a nonaqueous organic solvent.

The activated carbon included in the negative polarizable electrode may be composed primarily of steam-activated carbon and have micropores with a pore radius distribution peak, as determined by the MP method, in a range of $4.0\times10^{-10}$ to $1.0\times10^{-9}$ m.

The activated carbon included in the positive polarizable electrode may be composed primarily of alkali-activated carbon.

The invention makes it possible to obtain an electric double layer capacitor which, even when continuously charged under a high applied voltage, has a high percent retention of capacitance and a low degree of rise in internal resistance, and thus has an excellent durability. Moreover, the electric double layer capacitor of the invention has a low internal resistance in low-temperature environments, and also has excellent high-current charge/discharge characteristics.

BRIEF DESCRIPTION OF THE DIAGRAMS

DETAILED DESCRIPTION OF THE INVENTION

Figure 1:
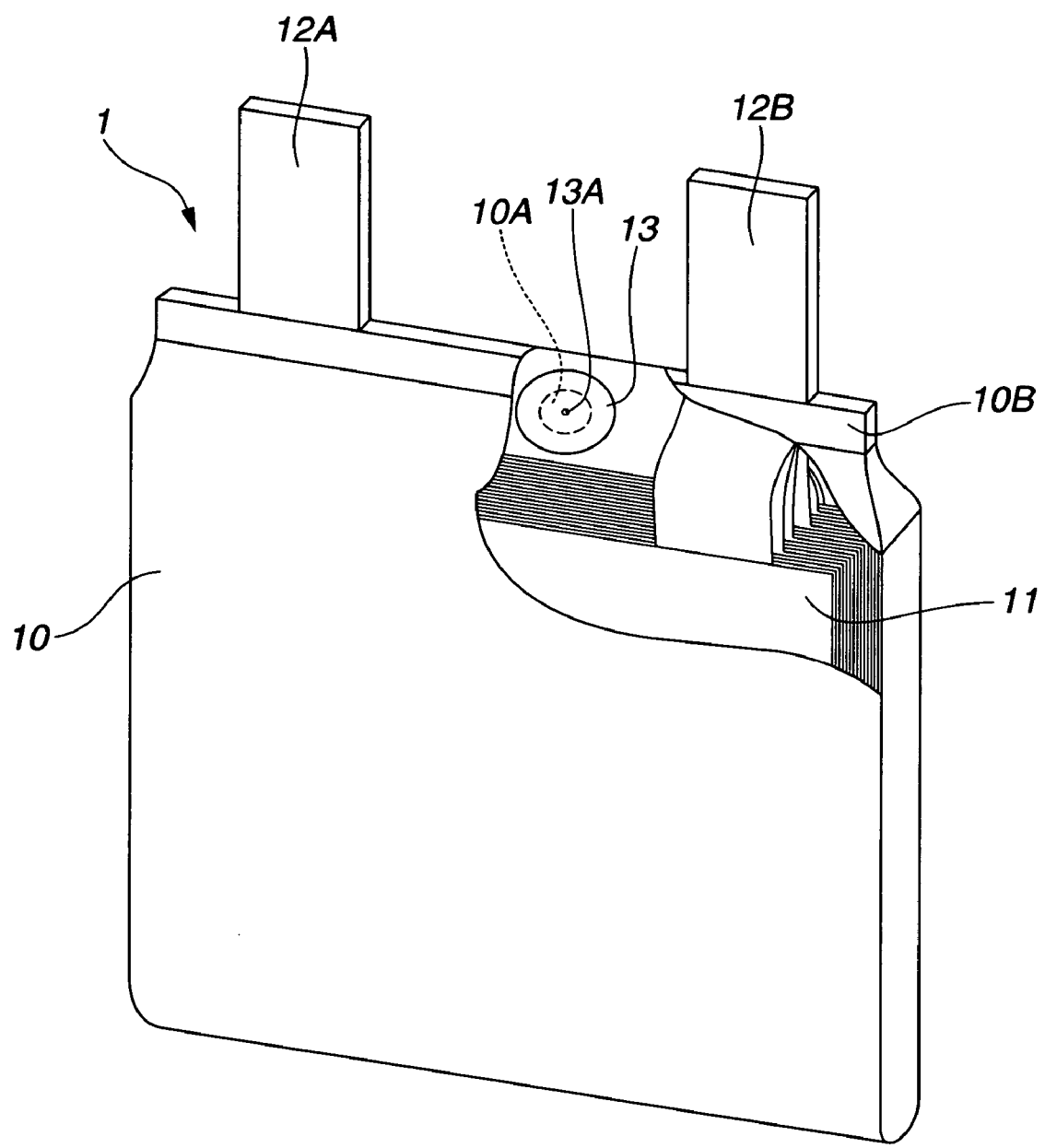
FIG. 1 is a partially cutaway perspective view of an electric double layer capacitor according to one embodiment of the invention.

The electric double layer capacitor of the invention has a pair of current collectors; a positive polarizable electrode which is provided on one of the pair of current collectors, is constructed so as to include activated carbon of a weight $W_+$, and has a capacitance $C_+$; a negative polarizable electrode which is provided on the other of the pair of current collectors, is constructed so as to include activated carbon of a weight $W_-$, and has a capacitance $C_-$; a separator interposed between the positive and negative polarizable electrodes; and an organic electrolytic solution which impregnates at least the positive and negative polarizable electrodes and the separator. The capacitance $C_+$ of the positive polarizable electrode and the capacitance $C_-$ of the negative polarizable electrode satisfy the condition $C_-/C_+=0.6$ to $1.0$, and the weight $W_+$ of the activated carbon included in the positive polarizable electrode and the weight $W_-$ of the activated carbon included in the negative polarizable electrode satisfy the condition $W_-/W_+=1.1$ to $2.0$.

In the capacitor of the invention, at a ratio $C_-/C_+$ between the respective capacitances of the positive and negative polarizable electrodes outside of the range from 0.6 to 1.0, after continuous charging under a high applied voltage, the capacitor will have a less than satisfactory durability, owing to, for example, a decrease in the percent retention of capacitance and an increase in internal resistance. The ratio $C_-/C_+$ is preferably from 0.67 to 0.97, and more preferably from 0.70 to 0.95.

The capacitance $C_+$ of the positive polarizable electrode and the capacitance $C_-$ of the negative polarizable electrode are calculated from the slopes of the respective positive and negative discharge curves when a reference electrode, such as a Ag/Ag$^+$ ion reference electrode, is built into the electric double layer capacitor and constant-current discharge is carried out from the rated voltage to 0 V at a current value corresponding to the one-hour rate.

Also, in the capacitor of the invention, at a ratio $W_-/W_+$ between the respective weights of the activated carbon used in the positive and negative polarizable electrodes outside of the range 1.1 to 2.0, a capacitor having a sufficient durability cannot be obtained. The ratio $W_-/W_+$ is preferably from 1.2 to 1.9, and more preferably from 1.3 to 1.8.

The weight $W_+$ of the activated carbon included in the positive polarizable electrode and the weight $W_-$ of the activated carbon included in the negative polarizable electrode indicate, respectively, the total weight of activated carbon included in the positive polarizable electrodes and the total weight of activated carbon included in the negative polarizable electrodes. These weights include the activated carbon in the polarizable electrodes formed as the outer layers on both sides of the current collectors.

Activated Carbon Used in Negative Polarizable Electrodes

Any activated carbon commonly used in electric double layer capacitors may be selected and used as the activated carbon in the negative polarizable electrode (also referred to below as "negative electrode activated carbon"), although one which is composed primarily of steam-activated carbon and has micropores with a pore radius distribution peak, as determined by the MP method, in a range of from $4.0\times10^{-10}$ to $1.0\times10^{-9}$ m (4.0 to 10 Å) is preferred. If this peak is below $4.0\times10^{-10}$ m, the high-current charge-discharge characteristics may decline and the charge-discharge characteristics at low temperatures may worsen. On the other hand, at above $1.0\times10^{-9}$ m, it is difficult to obtain a high specific surface area in the activated carbon; hence, the specific surface area becomes smaller, which may lower the capacitance.

In particular, the above peak is preferably in a range of $4.5\times10^{-10}$ to $9.0\times10^{-10}$ m (4.5 to 9.0 Å), and more preferably $5.0\times10^{-10}$ to $8.0\times10^{-10}$ m (5.0 to 8.0 Å).

As used herein, "composed primarily of" signifies that the foregoing activated carbon accounts for more than 50 wt % of the activated carbon used in the negative polarizable electrode. In view of such considerations as the above-mentioned high-current charge-discharge characteristics, it is advantageous for the foregoing activated carbon to account for preferably at least 60 wt %, more preferably at least 80 wt %, and ideally all (100 wt %) of the negative electrode activated carbon.

As used herein, "MP method" refers to the micropore method for measuring pore volume. Specifically, the thickness of the adsorption layer is computed from the relative pressure using the De Boer equation (see J. C. P. Broekhoff and J. H. De Boer: *J. Catalysis* 9 (1967), p. 15), a correlation plot (t-plot) of the adsorption layer thickness and the amount of nitrogen gas adsorption at the boiling point of −195.8° C. is prepared, the surface area for each interval is computed from the amount of change in the slope of the tangent at each point on the correlation plot, and the pore volume is determined from the amounts of change in these surface areas (see R. Sh. Mikhail, S. Brunauer and E. E. Bodor: *Journal of Colloid and Interface Science* 26 (1968), pp. 45-53).

The negative electrode activated carbon may be prepared from any suitable starting material without particular limitation, although it is preferable to use a starting material from which the activated carbon can be obtained by steam activation and which enables the pore radius distribution of the micropores, as determined by the MP method, to be set within the above range. A variety of starting materials may be used for the production of such activated carbon. Specific examples include coconut shells, coffee beans, bamboo, sawdust, coal-based pitch, petroleum-based pitch, coke, mesophase carbon, phenolic resins and vinyl chloride resins. Of these, non-graphitizable carbonaceous materials such as coconut shells and phenolic resins are suitable for producing polarizable electrodes, and the resulting capacitor has an improved durability.

Moreover, it is preferable for the negative electrode activated carbon of the invention to have a BET specific surface area of 1,500 to 2,500 m$^2$/g, a total pore volume of 0.8 to 1.5 mL/g, and a 50% particle size when used in polarizable electrodes of 3.0 to 15.0 μm.

At a BET specific surface area below 1,500 m$^2$/g, a sufficient capacitance may not be achieved, whereas above 2,500 m$^2$/g, the density of the polarizable electrode obtained may decrease. The BET specific area is more preferably from 1,700 to 2,200 m$^2$/g, and most preferably from 1,800 to 2,100 m$^2$/g.

At a total pore volume below 0.8 mL, it may not be possible to obtain a sufficient capacitance, whereas at above 1.5 mL/g, the number of mesopores and macropores increases, lowering the density of the polarizable electrode obtained, as a result of which the capacitance per unit volume may decrease.

At a 50% particle size when used in polarizable electrodes below 3.0 μm, the density of the polarizable electrode may decrease. On the other hand, at above 15.0 μm, the electrode resistance may increase. The 50% particle size range is more preferably from 5.0 to 13.0 μm, and even more preferably from 7.0 to 11.0 μm.

Activated Carbon Used in Positive Polarizable Electrodes

Any activated carbon commonly used in electric double layer capacitors may be selected and used as the activated carbon in the positive polarizable electrode (also referred to below as "positive electrode activated carbon"). However, to increase the capacitance density and to impart the capacitor with a higher output density and a higher energy density, the use of an activated carbon which is composed primarily of activated carbon obtained by alkali activation is preferred.

Here too, "composed primarily of" signifies that the foregoing activated carbon accounts for more than 50 wt % of the activated carbon used in the positive polarizable electrode. In view of such considerations as improving the energy density of the capacitor, it is advantageous for the foregoing activated carbon to account for preferably at least 60 wt %, more preferably at least 80 wt %, and ideally all (100 wt %) of the positive electrode activated carbon.

The positive electrode activated carbon may be prepared from any suitable starting material without particular limitation, although it is preferable to use a starting material from which the activated carbon can be obtained by alkali activation. A variety of starting materials may be used for the production of such activated carbon. Specific examples include coal-based pitch, petroleum-based pitch, coke, mesophase carbon, phenolic resins and vinyl chloride resins.

Moreover, it is preferable for the positive electrode activated carbon of the invention to have a BET specific surface area of 1,800 to 2,500 m$^2$/g, a total pore volume of 0.8 to 1.5 mL/g, and a 50% particle size when used in polarizable electrodes of 3.0 to 15.0 μm.

At a BET specific surface area below 1,800 m$^2$/g, a sufficient capacitance may not be achieved, whereas above 2,500 m$^2$/g, the density of the polarizable electrode obtained may decrease. The BET specific area is more preferably from 1,900 to 2,400 m$^2$/g, and most preferably from 2,000 to 2,300 m$^2$/g.

At a total pore volume below 0.8 mL, it may not be possible to obtain a sufficient capacitance, whereas at above 1.5 mL/g, the number of mesopores and macropores increases, lowering the density of the polarizable electrode obtained, as a result of which the capacitance per unit volume may decrease.

At a 50% particle size when used in polarizable electrodes below 3.0 μm, the density of the polarizable electrode may decrease. On the other hand, at above 15.0 μm, the electrode resistance may increase. The 50% particle size range is more preferably from 5.0 to 13.0 μm, and even more preferably from 7.0 to 11.0 μm.

Polarizable Electrodes

The polarizable electrodes of the inventive electric double layer capacitor are formed by a method which involves, for example, applying the above-described activated carbon and a binder in a mixed and dispersed state onto one or both sides of a current collector. The above ratios $C_-/C_+$ and $W_-/W_+$ are controlled at this time within appropriate ranges by choosing the activated carbon to be used in the positive and negative polarizable electrodes and also by adjusting the weight of activated carbon in the respective polarizable electrodes.

The electrode density of the polarizable electrodes, while not subject to any particular limitation, is preferably from 0.4 to 0.6 g/cm$^3$, and more preferably from 0.45 to 0.57 g/cm$^3$. At an electrode density below 0.4 g/cm$^3$, the energy density of the capacitor tends to decrease, whereas at a density above 0.6 g/cm$^3$, there is less space for the electrolytic solution, which may lower the high-current charge-discharge characteristics. "Electrode density" refers herein to the numerical value obtained by dividing the weight of the polarizable electrodes when dry by the apparent volume calculated from the surface area and thickness of the polarizable electrodes.

The thickness of the polarizable electrode formed on one side of the current collector is preferably from 20 to 200 μm, more preferably from 30 to 150 μm, and even more preferably from 40 to 120 μm.

Any current collectors commonly employed in electric double layer capacitors may be selected for use as the current collectors in the positive and negative polarizable electrodes. The current collectors are preferably aluminum foil, especially aluminum foil having an etched surface. As to the negative current collector, it include, in addition to the above, copper foil, nickel foil, and metal foil on the surface of which has been formed a copper plating film or a nickel plating film.

The foils making up the respective current collectors may be in any of various suitable forms, including ordinary foil, perforated mesh foil, or foil having a three-dimensional network structure. The current collector has a thickness of generally about 10 to 200 μm. However, taking into account such properties as the electrical conductivity and strength of the current collector, the thickness is preferably 15 to 100 μm, and more preferably 20 to 70.

Any of various known binders may be used. Illustrative examples include polytetrafluoroethylene, polyvinylidene fluoride, polyamideimide, carboxymethyl cellulose, fluoroolefin copolymer crosslinked polymers, polyvinyl alcohols, polyacrylic acid and polyimides. These may be used singly or as combinations of two or more thereof. Polyvinylidene fluoride and polyamideimide are especially preferred from the standpoint of polarizable electrode coatability, bond strength to the current collector, and electrode resistance near the end of the capacitor operating life.

These binders are added in an amount, per 100 parts by weight of activated carbon, of preferably from 0.5 to 20 parts by weight, and more preferably from 1 to 10 parts by weight.

A conductive material may be added to the polarizable electrodes of the invention. The conductive material may be any suitable material capable of conferring electrical conductivity to the polarizable electrodes. Illustrative, non-limiting, examples include carbon black, Ketjenblack, acetylene black, carbon whiskers, carbon fibers and nanocarbon materials such as carbon nanotubes; natural graphite, artificial graphite, titanium oxide and ruthenium oxide; and fibers or fine particles of metals such as aluminum, titanium and nickel. Any one or combination of two or more thereof may be used. Of these, Ketjenblack and acetylene black, both of which are types of carbon black, are preferred.

The average particle size of the conductive material is not subject to any particular limitation, although a size of generally 10 nm to 10 μm, preferably 10 to 100 nm, and more preferably 20 to 40 nm, is desirable. It is particularly advantageous for the conductive material to have an average particle size which is from 1/5000 to 1/2, and preferably from 1/1000 to 1/10, as large as the average particle size of the activated carbon.

The amount of conductive material included is not subject to any particular limitation, although addition of the conductive material in an amount of 0.1 to 20 parts by weight, and preferably 0.5 to 10 parts by weight, per 100 parts by weight of the activated carbon is desirable from the standpoint of such considerations as the capacitance and the conductivity-imparting effects.

The method of preparing the polarizable electrode-forming composition made up of activated carbon, a binder and, if necessary, a conductive material is not subject to any particular limitation. For example, use may be made of a method in which the composition is prepared in solution form by mixing together the activated carbon, the conductive material and the binder in the presence of a solvent in which the binder is soluble.

Separator

The separator in the inventive electric double layer capacitor may be of a type that is commonly used in electric double layer capacitors. Illustrative examples include those made of glass fibers, polyolefin, polyamideimide, polyester, fluorocarbon resins, cellulose-based material or the like. Specific examples include porous films made of polyolefins such as polyethylene or polypropylene, polyamideimide, polyvinylidene fluoride or polytetrafluoroethylene; polyolefin nonwoven fabric and polyester nonwoven fabric; and glass fiber sheets, cellulose paper. Separators containing electrically insulating inorganic fine particles or an insulating inorganic filler may also be used. In case of ion content in the electrolyte is higher, it is preferable to use the separator made of materials except cellulose.

In the electric double layer capacitor of the invention, letting the void volume of the positive polarizable electrode be $V_+$, the void volume of the negative polarizable electrode be $V_-$, and the void volume of the separator be $V_s$, the ratio $(V_+ + V_-)/V_s$ is preferably from 2.0 to 4.0, and more preferably from 2.5 to 3.5, and the ratio $V_-/V_+$ is preferably from 1.0 to 2.5, and more preferably from 1.3 to 2.0.

By adjusting the void volumes within the above ranges, properties such as the durability of the capacitor under high-voltage application, the high-current charge-discharge characteristics, and the cycle performance can be even further enhanced.

Organic Electrolytic Solution

The organic electrolytic solution in the electric double layer capacitor of the invention is either composed entirely of the ionic liquid of general formula (1) below, or is composed of an electrolyte (which may be an ionic liquid) dissolved in a nonaqueous organic solvent.

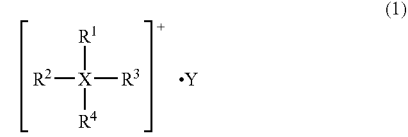

(1)

In the formula, $R^1$ to $R^4$ are each independently an alkyl group of 1 to 5 carbons or an alkoxyalkyl group of the formula $R'—O—(CH_2)_n—$ ($R'$ being methyl or ethyl, and the letter n being an integer from 1 to 4) and any two of $R^1$, $R^2$, $R^3$ and $R^4$ may form a ring together with X, with the proviso that at least one of $R^1$ to $R^4$ is the alkoxyalkyl group of the above formula; X is a nitrogen atom or a phosphorus atom; and Y is a monovalent anion.

Examples of the alkyl group of 1 to 5 carbons include methyl, ethyl, propyl, 2-propyl, butyl and pentyl. Examples of alkoxyalkyl groups of the formula $R'—O—(CH_2)_n—$ include methoxymethyl, ethoxymethyl, methoxyethyl and ethoxyethyl, methoxypropyl and ethoxypropyl, and methoxybutyl and ethoxybutyl.

Exemplary compounds in which any two groups from among $R^1$, $R^2$, $R^3$ and $R^4$ form a ring include, when X is a nitrogen atom, quaternary ammonium salts having an aziridine, azetidine, pyrrolidine or piperidine ring; and when X is a phosphorus atom, quaternary phosphonium salts having a pentamethylenephosphine (phospholinane) ring.

Preferred cations include the diethyl(2-methoxyethyl)-methylammonium cation and the N-(2-methoxyethyl)-N-methyl-pyrrolidinium cation.

Examples of anions that may be used as the constituent anions in the ionic liquid include, but are not limited to, $BF_4^-$, $CF_3BF_3^-$, $C_2F_5BF_3^-$, $PF_6^-$, $AsF_6^-$, $SbF_6^-$, $AlCl_4^-$, $HSO_4^-$, $ClO_4^-$, $CH_3SO_3^-$, $CF_3SO_3^-$, $CF_3CO_2^-$, $(CF_3SO_2)_2N^-$, $Cl^-$, $Br^-$ and $I^-$.

Preferred examples of ionic liquids include diethyl(2-methoxyethyl)methylammonium tetrafluoroborate, N-(2-methoxyethyl)-N-methylpyrrolidinium tetrafluoroborate, diethyl(2-methoxyethyl)methylammonium trifluoromethyl-trifluoroborate, N-(2-methoxyethyl)-N-methylpyrrolidinium trifluoromethyl-trifluoroborate, diethyl(2-methoxyethyl)methylammonium pentafluoroethyl-trifluoroborate and N-(2-methoxyethyl)-N-methylpyrrolidinium trifluoromethylpentafluoroethyltrifluoroborate. The ionic liquid may be used singly or as a mixture of two or more thereof.

The nonaqueous organic solvent is not subject to any particular limitation, provided it has the ability to dissolve the electrolyte, has a small molecular size, and is stable within the operating voltage range of the electric double layer capacitor. However, a nonaqueous organic solvent which has a large dielectric constant, a wide range of electrochemically stability and a broad service temperature range, and which also has an excellent safety is preferred.

Examples include propylene carbonate, ethylene carbonate, dimethyl carbonate, diethyl carbonate, methyl ethyl carbonate, acetonitrile, sulfolane, methylsulfolane, 2,4-dimethylsulfolane, γ-butyrolactone, tetrahydrofuran, 2-methyltetrahydrofuran, 1,3-dioxolane and 4-methyldioxalane. These solvents may be used singly or as mixtures of two or more thereof.

Of these solvents, propylene carbonate is especially preferred because it has a good ability to dissolve the electrolyte salt even at very low temperatures of −20° C. or below, an excellent electrical performance, and a relatively high flash point during use at elevated temperatures.

The organic electrolytic solution used in the inventive electric double layer capacitor may include any of various additives commonly employed in organic electrolytic solutions, such as surfactants, decomposition inhibitors, dehydrating agents, dehalogenating agents and flame retardants. The amount of these additives, while not subject to any particular limitation, is generally not more than 20 wt % of the organic electrolytic solution.

Suitable electrolytes include ionic liquids of above formula (1), other ionic liquids such as those described in JP-A 11-54375, and any of the various types of electrolytes known to be commonly used as crystalline electrolytes for electric double layer capacitors. However, if an ionic liquid is to be used, an ionic liquid of above formula (1) is preferred from the standpoint of withstand voltage, solvent solubility, and ionic conductivity.

For reasons having to do with the low-temperature properties of the capacitor, the ionic liquid of above formula (1) is preferably one having a melting point of 25° C. or below. Suitable ionic liquids of formula (1) are as noted above.

Examples of suitable crystalline electrolytes include the $BF_4$ salts, $PF_6$ salts, $ClO_4$ salts, $CF_3SO_3$ salts and $N(CF_3SO_2)_2$ salts of quaternary ammoniums such as tetraethylammonium, tetrabutylammonium and triethylmethylammonium. A salt in which the cation diameter is larger than the anion diameter is preferred.

In the practice of the invention, the electrolyte concentration of the organic electrolytic solution is preferably from 0.9 to 1.8 mol/L, more preferably 1.0 to 1.5 mol/L, and even more preferably 1.1 to 1.3 mol/L. At an electrolyte concentration outside of the range of 0.9 to 1.8 mol/L, the electrolytic solution may have a lower ionic conductivity, resulting in an increase in the direct current resistance during high-current discharge, particularly during high-current discharge at a low temperature.

Electric Double Layer Capacitor

The construction and form of the inventive electric double layer capacitor are not subject to any particular limitation, provided the capacitor has a pair of current collectors, positive and negative polarizable electrodes, a separator interposed between these electrodes, and an organic electrolytic solution impregnated within at least the positive and negative polarizable electrodes and the separator. Any of various types of known constructions may be employed, including multilayer capacitors like that shown in FIG. 1 and coin-shaped capacitors.

Figure 2:
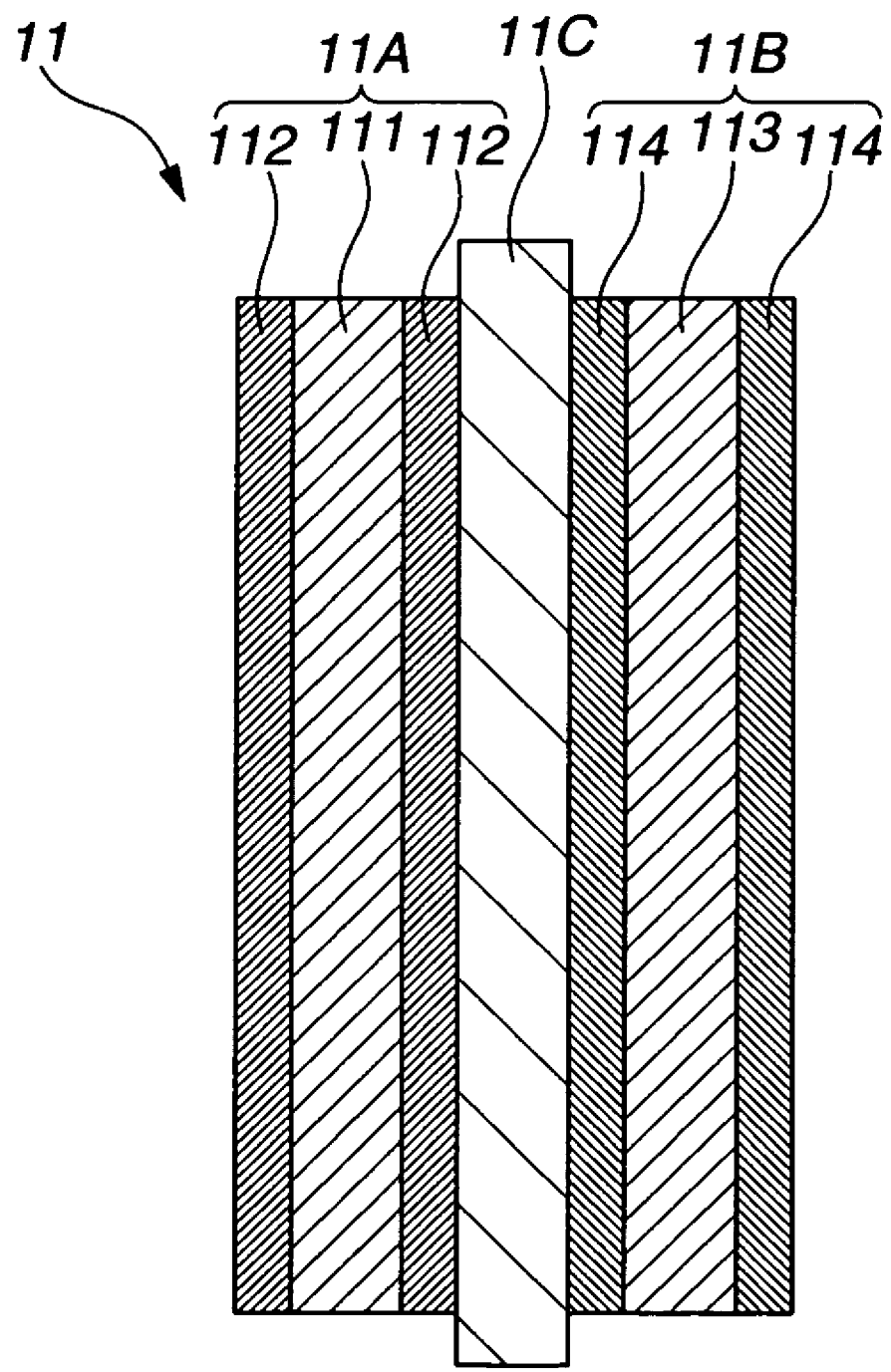
FIG. 2 is a partially enlarged sectional view showing the electrode group in the same embodiment.

An embodiment of the electric double layer capacitor of the invention is described in conjunction with the attached diagrams. Referring to FIGS. 1 and 2, an electric double layer capacitor 1 has an outer enclosure 10, an electrode group 11 housed within the outer enclosure 10, and an organic electrolytic solution (not shown) impregnated in at least the electrode group 11.

The organic electrolytic solution should impregnate at least the electrode group. For example, the organic electrolytic solution may be filled within the outer enclosure to such a degree as to immerse the electrode group.

As shown in FIG. 2, the electrode group 11 is composed of a positive polarizable electrode assembly 11A and a negative polarizable electrode assembly 11B in a multilayer stacked arrangement which includes a separator 11C disposed therebetween. The positive polarizable electrode assembly 11A is composed of positive polarizable electrodes 112 formed as layers on both sides of a positive current collector 111. The negative polarizable electrode assembly 11B is composed of negative polarizable electrodes 114 formed as layers on both sides of a negative current collector 113.

A higher number of stacked electrode assemblies enables the internal resistance to be reduced, and is thus beneficial. However, the volume of the current collectors and the separators as a proportion of the electrode group volume increases, lowering the volume output density. Hence, an upper limit in the number of stacked assemblies should be set in accordance with the internal resistance that is desired. The number of positive electrode assemblies and the number of negative electrode assemblies may be the same, or either may be higher than the other by one. The total number of positive and negative electrode assemblies is preferably at least 5, more preferably at least 7, and even more preferably at least 9. If both types of electrode assemblies are present in the same number, the electrode assemblies situated as the outermost layers of the electrode group consist of a positive electrode assembly on one side and a negative electrode assembly on the other side. On the other hand, if there is one more of either type of electrode assembly than of the other, the type of electrode assembly present in greater number will serve as both outermost layers.

In the electric double layer capacitor of the invention, for good durability, it is especially preferable that the electrode assemblies serving as the outermost layers have negative polarizable electrodes; i.e., that the number of negative electrode assemblies in the electrode group be at least one greater than the number of positive electrode assemblies.

The positive polarizable electrode assemblies 11A and the negative polarizable electrode assembles 11B making up the electrode group 11 have joined respectively thereto a positive terminal 12A and a negative terminal 12B which serve as current leads and extend from the interior of the outer enclosure 10 to the exterior. These terminals 12A and 12B are fixed to the outer enclosure 10 by an outer enclosure seal 10B where they emerge from the outer enclosure 10. Moreover, the positive polarizable electrode assemblies 11A are connected in parallel by the positive terminal 12A, and the negative polarizable electrode assemblies 11B are similarly connected in parallel by the negative terminal 12B. Such a construction in which the positive and negative polarizable electrode assemblies 11A and 11B are each connected in parallel is advantageous for reducing internal resistance. However, it is also acceptable to use a construction obtained by placing a separator between polarizable electrode assemblies in the form of long strips and winding the resulting arrangement of layers into a roll. Alternatively, electrode groups already stacked in small units may be connected in parallel in such a way as to achieve the desired capacitance.

Moreover, in this embodiment, a circular opening 10A which communicates between the interior and exterior of the outer enclosure 10 is formed in the outer enclosure 10 at a position located below and near to the seal 10B and between the two terminals 11A and 11B, and a substantially circular valve mechanism 13 is attached so as to cover this opening 10A from inside the outer enclosure 10.

The valve mechanism 13 is a substantially circular disc-like resin-based elastic body which has a hole 13A formed with a needle at substantially the center thereof and is attached to the outer enclosure 10 by thermal welding. The hole 13A is normally closed due to the resilience of the elastic body. However, when the internal pressure within the enclosure 10 rises, it opens, due likewise to the resilience of the elastic body, thereby releasing gases and the like which have built up at the interior of the enclosure 10.

The inventive electric double layer capacitor described above is a high-value capacitor having a cell capacitance of 100 to 10,000 F, preferably 150 to 5,000 F, and more preferably 200 to 2,000 F, and is suitable for use as a high-current storage device in applications that require a high current, such as electric cars and electrical power tools. The upper limit voltage (rated voltage) allowable for the electrical double layer capacitor of the invention may be set to 2.7 V or more, and preferably 3.0 V or more.

The inventive electric double layer capacitor can also, of course, be used as a memory backup power supply for cell phones, notebook computers and wireless terminals, as a power supply for cell phones and portable acoustic devices, as an uninterruptible power supply for personal computers and other equipment, and as various types of low-current electrical storage devices such as load leveling power supplies used in combination with solar power generation or wind power generation.

EXAMPLES

The following Examples of the invention and Comparative Examples are provided by way of illustration and not by way of limitation.

Example 1

(1) Manufacture of Positive Electrode Assembly

A coating slurry for the positive polarizable electrodes was prepared by mixing the activated carbon Maxsorb MSP20 (produced by Kansai Coke and Chemicals Co., Ltd.; BET specific surface area, 2,300 m$^2$/g; pore volume, 1.07 mL/g; 50% particle size, 9.5 μm), a conductive material (HS-100; Denki Kagaku Kogyo KK), and polyvinylidene fluoride (Sigma-Aldrich Japan KK; weight-average molecular weight, 534,000) as the binder in a weight ratio therebetween of 85:8:7 within N-methylpyrrolidone (NMP) as the coating solvent.

The slurry was applied to both sides of an etched aluminum foil (30CB; Japan Capacitor Industrial Co., Ltd.) as the positive current collector 111, then rolled using a roll press, following which the NMP was removed by drying so as to form positive polarizable electrodes 112, thereby giving a positive polarizable electrode assembly 11A. The apparent surface area of the polarizable electrodes 112 in this electrode assembly 11A was 130 cm$^2$, the electrode density was 0.54 g/cm$^3$, and the thickness of the polarizable electrode formed on one side of the current collector was 65 μm.

The BET specific surface area and the pore volume were values computed by the nitrogen gas adsorption method, and the 50% particle size was a value measured using the Microtrack HRA, a laser diffraction type particle size analyzer manufactured by Nikkiso Co., Ltd.

(2) Manufacture of Negative Electrode Assembly

A coating slurry for the negative polarizable electrodes was prepared by mixing the activated carbon LPY039 (produced by Japan EnviroChemicals, Ltd.; peak pore radius by MP method, 4.1×10$^{10}$ m; specific surface area, 1,900 m$^2$/g; pore volume, 0.90 mL/g; 50% particle size, 10.3 μm), a conductive material (HS-100; Denki Kagaku Kogyo KK), and polyvinylidene fluoride (Sigma-Aldrich Japan KK; weight-average molecular weight, 534,000) as the binder in a weight ratio therebetween of 85:7:8 within N-methylpyrrolidone (NMP) as the coating solvent.

The slurry was applied to both sides of an etched aluminum foil (30CB; Japan Capacitor Industrial Co., Ltd.) as the negative current collector 113, then rolled using a roll press, following which the NMP was removed by drying so as to form negative polarizable electrodes 114, thereby giving a negative polarizable electrode assembly 11B. The apparent surface area of the polarizable electrodes 114 in this electrode assembly 11B was 130 cm$^2$, the electrode density was 0.50 g/cm$^3$, and the thickness of the polarizable electrode formed on one side of the current collector was 75 μm.

The peak pore radius was a value calculated by the MP method based on the above BET measurement results.

(3) Manufacture of Electric Double Layer Capacitor

Nine positive polarizable electrode assemblies 11A and ten negative polarizable electrode assemblies 11B were alternately stacked, with separators 11C (NI040A, produced by Nippon Sheet Glass Co., Ltd.; porosity, 79.0%; thickness, 40 μm) placed therebetween (total number of separators, including outermost layers: 20). The positive and negative electrode assemblies were then collectively welded to aluminum terminals 12A and 12B, respectively, thereby giving an electrode group 11.

The resulting electrode group 11 was inserted into an outer enclosure 10 made of and aluminum laminate (produced by Dai Nippon Printing Co., Ltd.; 25-μm outer layer of 6-nylon, 40-μm gas barrier layer of soft aluminum, 30+15-μm inner layer of polypropylene+modified polypropylene) and having a valve 13. Next, 38 mL of an organic electrolytic solution was added to the enclosure 10 and impregnated into the electrolyte group 11, following which the outer enclosure 10 was thermally sealed at the seal 10B, thereby giving the electrical double layer capacitor 1 shown in FIG. 1. The organic electrolytic solution used here was prepared by dissolving diethyl(2-methoxyethyl)methylammonium tetrafluoroborate (an ionic liquid; abbreviated below as DEME-BF$_4$) as the electrolyte to a concentration of 1.3 mol/L in propylene carbonate (PC) as the solvent. Impregnation of the electrolytic solution was carried out under 12 or more hours of standing at 25° C. and a reduced pressure of 10 kPa.

Example 2

Aside from setting the thickness of the negative polarizable electrode formed on one side of the current collector to 85 μm and changing the amount the organic electrolytic solution added to 39 mL, an electric double layer capacitor was obtained in the same way as in Example 1.

Example 3

Aside from setting the thickness of the negative polarizable electrode formed on each side of the current collector to 90 μm and changing the amount of the organic electrolytic solution added to 41 mL, an electric double layer capacitor was obtained in the same way as in Example 1.

Example 4

Aside from setting the thickness of the negative polarizable electrode formed on one side of the current collector to 100 μm and changing the amount of the organic electrolytic solution added to 42 mL, an electric double layer capacitor was obtained in the same way as in Example 1.

Example 5

Aside from setting the thickness of the positive polarizable electrode formed on one side of the current collector to 60 μm, setting the thickness of the negative polarizable electrode formed on one side of the current collector to 105 μm, and changing the amount of the organic electrolytic solution added to 43 mL, an electric double layer capacitor was obtained in the same way as in Example 1.

Example 6

Aside from setting the thickness of the negative polarizable electrode formed on one side of the current collector to 110 μm, and changing the amount of the organic electrolytic solution added to 44 mL, an electric double layer capacitor was obtained in the same way as in Example 5.

Example 7

Aside from setting the thickness of the negative polarizable electrode formed on one side of the current collector to 113 μm, an electric double layer capacitor was obtained in the same way as in Example 5.

Example 8

Aside from using the activated carbon RP25 (Kuraray Coal, produced by Kuraray Chemical Co., Ltd.; peak pore radius by MP method, $4.7 \times 10^{-10}$ m; BET specific surface area, 2,500 m²/g; pore volume, 1.30 mL/g; 50% particle size, 7.5 μm) as the activated carbon in the negative polarizable electrodes, setting the thickness of the negative polarizable electrode formed on one side of the current collector to 80 μm. and adding 40 mL of a PC solution having a $DEME-BF_4$ concentration of 1.1 mol/L, an electric double layer capacitor was obtained in the same way as in Example 5. The electrode density in the negative polarizable electrode was 0.52 g/cm³.

Example 9

Aside from using the activated carbon YP20 (Kuraray Coal, produced by Kuraray Chemical Co., Ltd.; peak pore radius by MP method, $4.3 \times 10^{-10}$ m; BET specific surface area, 2,100 m²/g; pore volume, 1.06 mL/g; 50% particle size, 5.5 μm) as the activated carbon in the negative polarizable electrodes, setting the thickness of the negative polarizable electrode formed on one side of the current collector to 100 μm, and adding 45 mL of a PC solution having a $DEME-BF_4$ concentration of 1.1 mol/L, an electric double layer capacitor was obtained in the same way as in Example 1. The electrode density in the negative polarizable electrode was 0.50 g/cm³.

Example 10

Aside from using the activated carbon YP20 as the activated carbon in the positive and negative polarizable electrodes, setting the thickness of the positive polarizable electrode formed on one side of the current collector to 70 μm, setting the thickness of the negative polarizable electrode formed on one side of the current collector to 85 μm, and adding 44 mL of a PC solution having a $DEME-BF_4$ concentration of 1.1 mol/L, an electric double layer capacitor was obtained in the same way as in Example 1. The electrode densities in the negative and positive polarizable electrodes were both 0.50 g/cm³.

Example 11

Aside from using polyamideimide (Vylomax, produced by Toyobo Co., Ltd.; solids concentration, 20%; solvent, NMP; solution viscosity, 46.5 dPa·s) as the binder in the positive and negative polarizable electrodes, using a polyester nonwoven fabric (porosity, 62.0%; thickness, 35 μm) as the separator, using a PC solution having an N-(2-methoxethyl)-N-methylpyrrolidinium tetrafluoroborate (ionic liquid, $PROME-BF_4$) concentration of 0.9 mol/L as the organic electrolytic solution, and adding 43 mL of this electrolytic solution, an electric double layer capacitor was obtained in the same way as in Example 4.

Example 12

Aside from using the separator NI040A and using a PC solution having a $PROME-BF_4$ concentration of 1.5 mol/L as the organic electrolytic solution, an electric double layer capacitor was obtained in the same way as in Example 11.

Example 13

Aside from setting the thickness of the positive polarizable electrode formed on one side of the current collector to 110 μm, setting the thickness of the negative polarizable electrode formed on one side of the current collector to 170 μm, alternately stacking five positive electrode assemblies and six negative electrode assemblies with the separator NI040A placed therebetween (total number of separators, including outermost layers: 12), and adding 38 mL of a PC solution having a $DEME-BF_4$ concentration of 1.1 mol/L, an electric double layer capacitor was obtained in the same way as in Example 1. The electrode density was 0.54 g/cm³ in the positive polarizable electrodes and 0.50 g/cm³ in the negative polarizable electrodes.

Example 14

Aside from using a PC solution having a DEME-BF$_4$ concentration of 1.1 mol/L as the organic electrolytic solution, an electric double layer capacitor was obtained in the same way as in Example 4.

Example 15

Aside from setting the thickness of the positive polarizable electrode formed on one side of the current collector to 45 μm, setting the thickness of the negative polarizable electrode formed on one side of the current collector to 70 μm, alternately stacking 13 positive electrode assemblies and 14 negative electrode assemblies with the separator NI040A placed therebetween (total number of separators, including outermost layers: 28), and adding 47 mL of a PC solution having a DEME-BF$_4$ concentration of 1.1 mol/L as the organic electrolytic solution, an electric double layer capacitor was obtained in the same way as in Example 1. The electrode density was 0.54 g/cm$^3$ in the positive polarizable electrodes and 0.50 g/cm$^3$ in the negative polarizable electrodes.

Example 16

Aside from alternately stacking the positive and negative electrode assemblies with two layers of the separator NI040A interposed between adjoining electrode assemblies, using a PC solution having a tetraethylammonium tetrafluoroborate (TEA-BF$_4$) concentration of 1.2 mol/L as the organic electrolytic solution and adding 52 mL of this electrolytic solution, an electric double layer capacitor was obtained in the same way as in Example 4.

Example 17

Aside from using a polyamideimide porous film (porosity, 65.0%; thickness, 40 μm) as the separator, using a PC solution having a TEA-BF$_4$ concentration of 1.2 mol/L as the organic electrolytic solution, and adding 41 mL of this electrolytic solution, an electric double layer capacitor was obtained in the same way as in Example 4.

Example 18

Aside from alternately stacking 17 positive electrode assemblies and 18 negative electrode assemblies with the separator NI040A interposed therebetween (total number of separators, including outermost layers: 36), using a PC solution having a PROME-BF$_4$ concentration of 1.1 mol/L as the organic electrolytic solution, and adding 78 mL of this electrolytic solution, an electric double layer capacitor was obtained in the same way as in Example 4.

Example 19

Aside from setting the apparent surface area of the polarizable electrodes to 33 cm$^2$ and changing the amount of the organic electrolytic solution added to 20 mL, an electric double layer capacitor was obtained in the same way as in Example 18.

Comparative Example 1

Aside from setting the thickness of the negative polarizable electrode formed on one side of the current collector at 65 μm and changing the amount of the organic electrolytic solution added to 36 mL, an electric double layer capacitor was obtained in the same way as in Example 1.

Comparative Example 2

Aside from setting the thickness of the negative polarizable electrode formed on one side of the current collector at 130 μm and changing the amount of the organic electrolytic solution added to 49 mL, an electric double layer capacitor was obtained in the same way as in Example 1.

Comparative Example 3

Aside from setting the thickness of the negative polarizable electrode formed on one side of the current collector at 60 μm and changing the amount of the organic electrolytic solution added to 36 mL, an electric double layer capacitor was obtained in the same way as in Example 10.

Comparative Example 4

Aside from setting the thickness of the positive polarizable electrode formed on one side of the current collector at 65 μm, setting the thickness of the negative polarizable electrode formed on one side of the current collector at 100 μm, and changing the amount of the organic electrolytic solution added to 43 mL, an electric double layer capacitor was obtained in the same way as in Example 10.

Structural characteristics of the electric double layer capacitors obtained in the respective examples of the invention and the comparative examples are summarized in Table 1 below.

In Table 1, the respective capacitances $C_+$ and $C_-$ of the positive and negative polarizable electrodes were calculated from the respective positive and negative discharge curves when a reference electrode such as a Ag/Ag$^+$ ion reference electrode is built into the electric double layer capacitor and constant-current discharge is carried out from the rated voltage to 0 V at a current value corresponding to the one-hour rate. The void volume $V_s$ of the separator and the void volumes $V_+$ and $V_-$ of the positive and negative polarizable electrodes were determined from the weight of the impregnated electrolytic solution and the specific gravity of the electrolytic solution when the electrolytic solution was thoroughly impregnated into the same separators and the same positive and negative polarizable electrodes as those used in the respective examples of the invention and comparative examples and under the same conditions as during manufacture of the electric double layer capacitors. The porosity of the separator was determined from the apparent volume and void volume $V_s$ of the separator. The total void volume $V_p$ of the capacitor was the sum of the respective void volumes of the separator and the positive and negative polarizable electrodes ($V_s+V_++V_-$).

TABLE 1

| | | Positive polarizable electrode | | Negative polarizable electrode | | Separator | | Organic electrolytic solution | | Total | Capacitor | | | | |
|---|---|---|---|---|---|---|---|---|---|---|---|---|---|---|---|
| | | Activated carbon weight $W_+$ (g) | Void volume $V_+$ (mL) | Activated carbon weight $W_-$ (g) | Void volume $V_-$ (mL) | Porosity (%) | Void volume $V_s$ (mL) | Electrolyte concentration (mol/L) | Total electrolytic solution volume $V_a$ (mL) | Total void volume $V_p$ (mL) | $C_-/C_+$ | $W_-/W_+$ | $V_-/V_+$ | $(V_++V_-)/V_s$ | $V_a/V_p$ |
| Example | 1 | 6.90 | 11.30 | 8.27 | 14.95 | 79.0 | 9.92 | 1.3 | 38.0 | 36.2 | 0.61 | 1.20 | 1.32 | 2.65 | 1.05 |
| | 2 | 6.90 | 11.30 | 9.38 | 16.94 | 79.0 | 9.92 | 1.3 | 39.0 | 38.2 | 0.69 | 1.36 | 1.50 | 2.85 | 1.02 |
| | 3 | 6.90 | 11.30 | 9.93 | 17.94 | 79.0 | 9.92 | 1.3 | 41.0 | 39.2 | 0.73 | 1.44 | 1.59 | 2.95 | 1.05 |
| | 4 | 6.90 | 11.30 | 11.03 | 19.93 | 79.0 | 9.92 | 1.3 | 42.0 | 41.2 | 0.81 | 1.60 | 1.76 | 3.15 | 1.02 |
| | 5 | 6.37 | 10.43 | 11.58 | 20.93 | 79.0 | 9.92 | 1.3 | 43.0 | 41.3 | 0.92 | 1.82 | 2.01 | 3.16 | 1.04 |
| | 6 | 6.37 | 10.43 | 12.13 | 21.93 | 79.0 | 9.92 | 1.3 | 44.0 | 42.3 | 0.96 | 1.91 | 2.10 | 3.26 | 1.04 |
| | 7 | 6.37 | 10.43 | 12.41 | 22.43 | 79.0 | 9.92 | 1.3 | 44.0 | 42.8 | 0.99 | 1.95 | 2.15 | 3.31 | 1.03 |
| | 8 | 6.37 | 10.43 | 8.83 | 15.95 | 79.0 | 9.92 | 1.1 | 40.0 | 36.3 | 0.82 | 1.39 | 1.53 | 2.66 | 1.10 |
| | 9 | 6.90 | 11.30 | 11.03 | 19.93 | 79.0 | 9.92 | 1.1 | 45.0 | 41.2 | 0.82 | 1.60 | 1.76 | 3.15 | 1.09 |
| | 10 | 6.88 | 12.57 | 9.38 | 16.94 | 79.0 | 9.92 | 1.1 | 44.0 | 39.4 | 0.82 | 1.36 | 1.35 | 2.98 | 1.12 |
| | 11 | 6.90 | 11.30 | 11.03 | 19.93 | 62.0 | 6.88 | 0.9 | 43.0 | 38.12 | 0.81 | 1.60 | 1.76 | 4.54 | 1.05 |
| | 12 | 6.90 | 11.30 | 11.03 | 19.93 | 79.0 | 9.92 | 1.5 | 43.0 | 41.2 | 0.81 | 1.60 | 1.76 | 3.15 | 1.04 |
| | 13 | 6.48 | 10.62 | 11.25 | 20.33 | 79.0 | 5.95 | 1.1 | 38.0 | 36.9 | 0.81 | 1.74 | 1.91 | 5.20 | 1.03 |
| | 14 | 6.90 | 11.30 | 11.03 | 19.93 | 79.0 | 9.92 | 1.1 | 42.0 | 41.2 | 0.81 | 1.60 | 1.76 | 3.15 | 1.02 |
| | 15 | 6.90 | 11.30 | 10.81 | 19.54 | 79.0 | 13.89 | 1.1 | 47.0 | 44.7 | 0.82 | 1.57 | 1.73 | 2.22 | 1.05 |
| | 16 | 6.90 | 11.30 | 11.03 | 19.93 | 79.0 | 19.84 | 1.2 | 52.0 | 51.1 | 0.81 | 1.60 | 1.76 | 1.57 | 1.02 |
| | 17 | 6.90 | 11.30 | 11.03 | 19.93 | 65.0 | 8.23 | 1.2 | 41.0 | 39.5 | 0.81 | 1.60 | 1.76 | 3.80 | 1.04 |
| | 18 | 13.03 | 21.34 | 19.86 | 35.88 | 79.0 | 17.86 | 1.1 | 78.0 | 75.1 | 0.81 | 1.52 | 1.68 | 3.20 | 1.04 |
| | 19 | 3.28 | 5.37 | 4.99 | 9.02 | 79.0 | 4.94 | 1.1 | 20.0 | 19.3 | 0.81 | 1.52 | 1.68 | 2.91 | 1.03 |
| Comparative Example | 1 | 6.90 | 11.30 | 7.17 | 12.96 | 79.0 | 9.92 | 1.3 | 36.0 | 34.2 | 0.53 | 1.04 | 1.15 | 2.44 | 1.05 |
| | 2 | 6.90 | 11.30 | 14.32 | 25.87 | 79.0 | 9.92 | 1.3 | 49.0 | 47.1 | 1.05 | 2.08 | 2.29 | 3.75 | 1.04 |
| | 3 | 6.88 | 12.57 | 6.62 | 11.96 | 79.0 | 9.92 | 1.3 | 36.0 | 34.5 | 0.58 | 0.96 | 0.95 | 2.47 | 1.04 |
| | 4 | 6.39 | 11.68 | 11.03 | 19.93 | 79.0 | 9.92 | 1.3 | 43.0 | 41.5 | 1.04 | 1.73 | 1.71 | 3.19 | 1.04 |

The following tests were performed on each of the capacitors obtained in the respective above examples of the invention and comparative examples. The results are shown in Table 2.

Initial Characteristics

The capacitance and internal resistance (25° C., −30° C.) following manufacture were measured.

The capacitance was calculated from the total amount of energy discharged when, after being constant-current charged to 3.0 V at the one-hour rate current and constant-voltage charged thereafter for 30 minutes, the capacitor was constant-current discharged from 3.0 V to 0 V at the one-hour rate current.

To obtain the internal resistance, the capacitor was constant-current charged at the one-hour rate current to 3.0 V and constant-voltage charged thereafter for 30 minutes, then constant-current discharged from 3.0 V at the 1/30 hour rate current. The direct-current resistance was determined from the point of intersection by the approximately straight line portion of the resulting discharge curve in the interval from 5 to 10 seconds after discharge with the Y axis at 0 seconds.

The internal resistance at low temperature was similarly measured after holding the capacitor in a thermostatic chamber at −30° C. for 6 hours.

Endurance Test

The capacitor was subjected to 1,000 hours of constant-voltage charging at a voltage setting of 3.0 V in a thermostatic chamber at 70° C. The capacitance and internal resistance (25° C.) following the endurance test were measured by the same methods as described above, and the results compared with the initial values.

High-Current Cycling Test

The capacitors obtained in Examples 4, 11, 12, 14, 16 and 17 of the invention were subjected to another endurance test: a high-current cycling test of 10,000 cycles in a 25° C. environment, and at a minimum voltage of 1.5 V, a maximum voltage of 3.0 V, a charge-discharge current of 40 A, constant voltage, and no resting. The capacitances obtained before and after this endurance test were compared.

During measurement of the capacitance and the internal resistance, and during the endurance test, a stress of 0.1 MPa was applied to the capacitor in the stacking direction.

TABLE 2

|  |  | Initial characteristics | | | After 1,000 hours of continuous charging | | Change in internal resistance (as a multiple of initial value) | After charge-discharge cycling at 40 A | |
|---|---|---|---|---|---|---|---|---|---|
|  |  | Capacitance (F) | Internal resistance at 25° C. (mΩ) | Internal resistance at −30° C. (mΩ) | Capacitance (F) | Retention of capacitance (%) | Internal resistance at 25° C. (mΩ) | Capacitance (F) | Retention of capacitance (%) |
| Example | 1 | 480 | 2.35 | 19.5 | 385 | 80.2 | 10.7 | 4.5 | — | — |
|  | 2 | 520 | 2.41 | 20.0 | 425 | 81.7 | 10.8 | 4.5 | — | — |
|  | 3 | 535 | 2.43 | 20.2 | 455 | 85.0 | 9.3 | 3.8 | — | — |
|  | 4 | 570 | 2.48 | 20.6 | 495 | 86.8 | 8.0 | 3.2 | 460 | 80.7 |
|  | 5 | 565 | 2.48 | 20.6 | 485 | 85.8 | 8.7 | 3.5 | — | — |
|  | 6 | 580 | 2.51 | 20.8 | 480 | 82.8 | 10.5 | 4.2 | — | — |
|  | 7 | 585 | 2.52 | 20.9 | 465 | 79.5 | 11.3 | 4.5 | — | — |
|  | 8 | 530 | 2.49 | 19.1 | 460 | 86.8 | 8.0 | 3.2 | — | — |
|  | 9 | 575 | 2.63 | 20.2 | 490 | 85.2 | 10.5 | 4.0 | — | — |
|  | 10 | 440 | 2.58 | 19.8 | 375 | 85.2 | 10.6 | 4.1 | — | — |
|  | 11 | 570 | 2.71 | 19.0 | 505 | 88.6 | 7.0 | 2.6 | 425 | 74.6 |
|  | 12 | 580 | 3.10 | 36.6 | 465 | 80.2 | 8.7 | 2.8 | 465 | 80.2 |
|  | 13 | 535 | 5.75 | 44.2 | 430 | 80.4 | 40.5 | 7.0 | — | — |
|  | 14 | 570 | 2.63 | 20.2 | 485 | 85.1 | 11.1 | 4.2 | 450 | 78.9 |
|  | 15 | 575 | 1.67 | 12.9 | 500 | 87.0 | 4.4 | 2.6 | — | — |
|  | 16 | 570 | 3.93 | 30.4 | 450 | 78.9 | 18.1 | 4.6 | 485 | 85.1 |
|  | 17 | 570 | 2.54 | 19.6 | 455 | 79.8 | 10.8 | 4.3 | 445 | 78.1 |
|  | 18 | 1080 | 1.46 | 11.2 | 945 | 87.5 | 3.5 | 2.4 | — | — |
|  | 19 | 270 | 5.16 | 39.6 | 230 | 85.2 | 12.4 | 2.4 | — | — |
| Comparative Example | 1 | 440 | 2.30 | 19.1 | 90 | 20.5 | 83.2 | 36.1 | — | — |
|  | 2 | 655 | 2.64 | 21.9 | 255 | 38.9 | 28.9 | 11.0 | — | — |
|  | 3 | 360 | 2.30 | 19.1 | 90 | 25.0 | 73.9 | 32.1 | — | — |
|  | 4 | 460 | 2.48 | 20.6 | 135 | 29.3 | 19.8 | 8.0 | — | — |

Note:
The rated voltage of the capacitors was 3 V.

As is apparent from Table 2, compared with the electric double layer capacitors in the comparative examples, the electric double layer capacitors obtained in each of the examples of the invention had a higher percent retention of capacitance after continuous charging, a lower degree of rise in internal resistance, and excellent durability even when continuously charged under a high voltage of 3.0 V. Moreover, the results of the 40 A charge-discharge cycling test showed that the capacitors obtained in the examples of the invention had excellent cycle characteristics during high-current charging and discharging.

Japanese Patent Application No. 2005-277461 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An electric double layer capacitor comprising:
   a pair of current collectors;
   a positive polarizable electrode which is provided on one of the pair of current collectors, constructed so as to include activated carbon of a weight $W_+$, and has a capacitance $C_+$;
   a negative polarizable electrode which is provided on the other of the pair of current collectors, constructed so as to include activated carbon of a weight $W_-$, and has a capacitance $C_-$;
   a separator interposed between the positive and negative polarizable electrodes; and
   an organic electrolytic solution which impregnates at least the positive and negative polarizable electrodes and the separator;

wherein the capacitance $C_+$ of the positive polarizable electrode and the capacitance $C_-$ of the negative polarizable electrode satisfy the condition $C_-/C_+ = 0.6$ to $1.0$, and the weight $W_+$ of the activated carbon included in the positive polarizable electrode and the weight $W_-$ of the activated carbon included in the negative polarizable electrode satisfy the condition $W_-/W_+ = 1.1$ to $2.0$.

2. The electric double layer capacitor of claim 1, wherein the organic electrolytic solution includes at least an ionic liquid of formula (1)

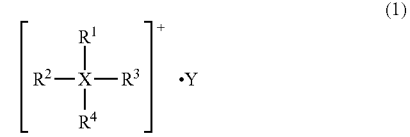

wherein $R^1$ to $R^4$ are each independently an alkyl group of 1 to 5 carbons or an alkoxyalkyl group of the formula $R'\text{—}O\text{—}(CH_2)_n\text{—}$ ($R'$ being methyl or ethyl, and the letter n being an integer from 1 to 4) and any two of $R^1$, $R^2$, $R^3$ and $R^4$ may form a ring together with X, with the proviso that at least one of $R^1$ to $R^4$ is the alkoxyalkyl group of the above formula; X is a nitrogen atom or a phosphorus atom; and Y is a monovalent anion.

3. The electric double layer capacitor of claim 1, wherein the organic electrolytic solution includes a nonaqueous organic solvent.

4. The electric double layer capacitor of claim 1, wherein the activated carbon included in the negative polarizable electrode is composed primarily of steam-activated carbon and has micropores with a pore radius distribution peak, as determined by the MP method, in a range of $4.0 \times 10^{-10}$ to $1.0 \times 10^{-9}$ m.

5. The electric double layer capacitor of claim 1, wherein the activated carbon included in the positive polarizable electrode is composed primarily of alkali-activated carbon.

* * * * *